G. HOTCHKISS.
Car Brake.
No. 12,552.
Patented Mar. 20, 1855.
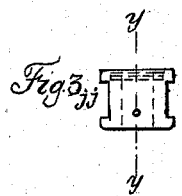
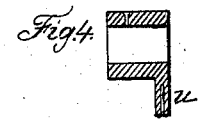
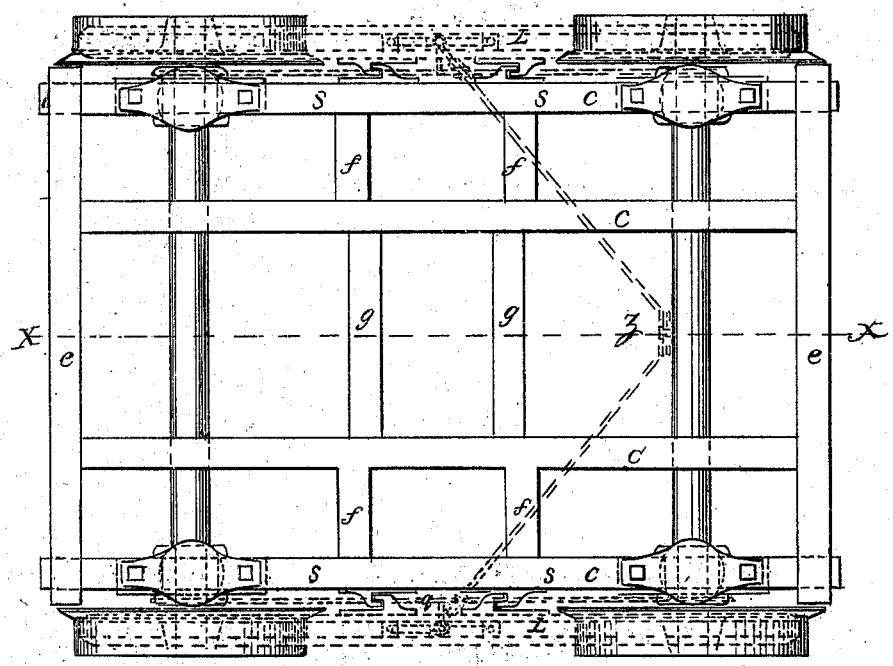
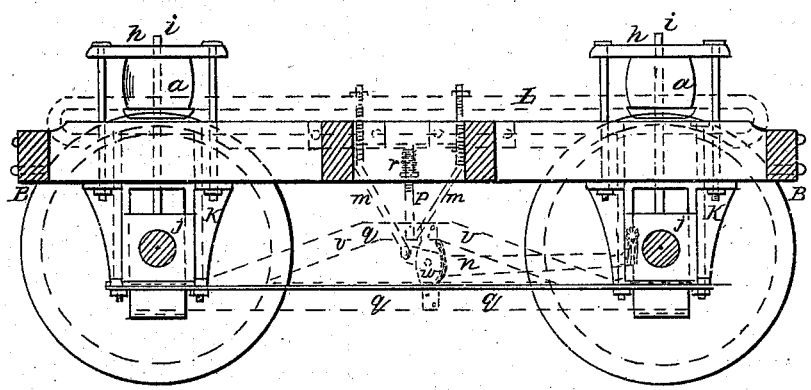

UNITED STATES PATENT OFFICE.

GIDEON HOTCHKISS, OF WINDSOR, NEW YORK.

RAILROAD-CAR BRAKE.

Specification of Letters Patent No. 12,552, dated March 20, 1855.

*To all whom it may concern:*

Be it known that I, GIDEON HOTCHKISS, of the town of Windsor, county of Broome, and State of New York, have invented a new and useful Improvement in the Construction of Railroad-Car Brakes; and I do hereby declare that the following is a full, clear, and exact description of the same, reference being had to the annexed drawings and letters of reference marked thereon, like letters representing like parts.

Figure 1, is a top view of the truck with brake; Fig. 2, is a section on line $x, x$, Fig. 1; Fig. 3, is a top view of the box; Fig. 4, is a section on line $y, y$, Fig. 3. Figs. 1 and 2, give a top and sectional view of the ordinary passenger car truck with inside bearings adapted to the wide or six foot gage, with the rocker removed.

As rail roads are now generally constructed with light, defective and imperfectly secured rails, springs must be interposed between the wheel axles and the truck frames, to permit the wheels to follow the undulations and inequalities of the rails, so that there is a constant play between the wheels and the truck frames.

The brakes as heretofore generally constructed and applied are connected with the truck frames and move up and down with them, from which it follows, as a necessary consequence that when the brakes are applied to the tread of the wheels to make the requisite friction for stopping the car or train, a constant play takes place between the wheels and the brakes, which is injurious to the action of brakes and to the connecting parts. When the brakes are, as usual, applied at the ends of the trucks, and forced against the wheels to stop them, the wheels being in motion have a tendency to draw down the forward end of the trucks and throw up the rear end thus producing an unsteady motion and an alternate slip and hold which renders the action of the brakes very imperfect, increasing the bite on the forward wheels and reducing it on the rear wheels, so that in many instances the rear wheels will slip on the rails while the forward wheels turn, thus lessening the retarding power of the brakes and wearing the wheels and rails unequally.

Another objection to the present mode of applying brakes is the uneven and lateral wear of the journal boxes by reason of the application of the force of the brakes against the wheels in a horizontal or nearly horizontal line, which must be resisted by the journal boxes, which soon wear, so that the journals become loose producing an unsteady motion. And still another difficulty arises from the present manner of hanging the brakes, with the connecting bars extending from side to side of the car. If the connections break they fall on the track and throw the car off. And when the car is in motion they present a considerable surface to the resistance of the air and in a great measure aid in raising the dust from the track. And my invention also consists in connecting the levers, or mechanism for operating the brakes, with the journal boxes, by means of bridge bars or the equivalent thereof attached to the journal boxes, whereby I avoid the defects heretofore experienced by reason of the attachment of the brakes to the truck frames.

In the accompanying drawings $c, c, e, e, f, f, g, g$, represent the timbers suitably framed together to form a truck frame such as are used for cars having axles with inside bearing for wide gage roads. This truck is provided with suitable pedicles $k, k$, to which are fitted the journal boxes $j$, adapted to slide therein vertically, and made to extend below the pedicles for a purpose to be presently described.

The upper part of the truck is provided with india rubber springs $a$, (or other springs, at pleasure) one for each journal box, and secured in place by caps $h, h$. Bolts $i, i$, extend from the said springs down through the truck and rest on the journal boxes.

On each side of the truck there is an arch beam $q$, the ends of which are properly secured to the two journal boxes, where the said boxes project below the pedestals. These bridge bars I prefer to make of iron, with one horizontal bar $q$, and brace or arch pieces $v, v$, at top to give the required rigidity with the least possible weight.

At about the middle of the length of the bridge bar is secured what I term the key $w$ made of two parts so fitted and secured to the parts $q$, and $v$, as to form a mortise through which a lever $n$, passes; the said lever having its fulcrum in the key. The long arm of this lever is to be connected with the usual or any other suitable mechanism for applying the power to work the brakes; and the short arm is jointed to two rods $m$, $m$, called the anchor bolts which diverge in opposite directions and extending up to, and through the brake L, which is a lever made of wood or other suitable material.

The rods $m$, $m$, are topped where they pass through the brake to receive nuts above and below the brake bar, by means of which the anchor rods are well secured and admit of adjusting the brake to the wheels.

The bar L, constituting the brake extends along the side of the truck frame, and of sufficient length to extend over the two wheels, and the under face is curved out to fit over each wheel. The parts fitting over the wheels should be shod as is generally practiced with the ordinary brakes.

The inner faces of the brake bars are connected with the sides of the truck by means of clutch ways $s$, $s$, which admit of the brake sliding vertically and freely on the truck frame, and by which they are guided and held to the truck.

There is a vertical rod $p$, extending up vertically from the top of the bridge bar, and fitting in a hole in the brake beam and provided with a helical or other spring to force up the brake clear of the wheels the moment the lever $n$, is liberated. There is to be a like arrangement on each side of the truck.

From the foregoing it will be seen that the bridge bar is secured to the two boxes on one side of the truck, and the lever $n$, has its fulcrum in the bridge bar and its short arm connected with the rods $m$, $m$, which I term the anchor bolts, and that these in turn are secured to the brake bar with a small spring $r$, interposed so that when the requisite power is applied to the long arm of the lever, the short arm, by its connection, draws the brake bar L, directly down on top of the wheels, thereby making equal pressure on each and every wheel, and there remaining as long as may be desired without any play between the brake and the wheel, so that a very short motion of the brake will make it clear of the wheels, or press upon them to make the requisite friction to stop the cars. As the lever for operating the brake has its fulcrum on the bridge bar connected with the journal boxes, the brakes and their connections will move up and down with the wheels, indepently of the truck frames, as they follow the undulations of the road. The pressure of the brakes upon the wheels being in vertical lines, will avoid all lateral strain and thus avoid the unequal wear of the journal boxes.

I do not claim as my invention the mere application of the brake to the top of the wheel, nor do I intend to confine my claim to the application of the brake by the means described to the top of the wheel only, because by a slight modification and change the principle and means claimed as original may be applied so as to press the brake to other parts of the wheel, and accomplish or tend to accomplish the same object; but What I do claim as my invention and desire to secure by Letters Patent is—

The method of operating a rail road car brake by obtaining the leverage from the axles and boxes, by means of the bridges, keys and clutches, or their equivalent, substantially as set forth in the above specifications and represented in the drawings accompanying the same.

I have described my improvements as applied to trucks for wide-gage roads having axles with inside bearings, but it will be obvious that they are applicable to trucks having axles with outside bearings and also to cars without trucks and I therefore claim my improvements when applied to axles with outside or inside bearings and also to cars without trucks.

GIDEON HOTCHKISS.

Witnesses:
   Wm. Blaisdell,
   E. P. Averill.